F. B. HEIBEL.
SAW GUARD.
APPLICATION FILED NOV. 15, 1919.
1,367,045.
Patented Feb. 1, 1921.
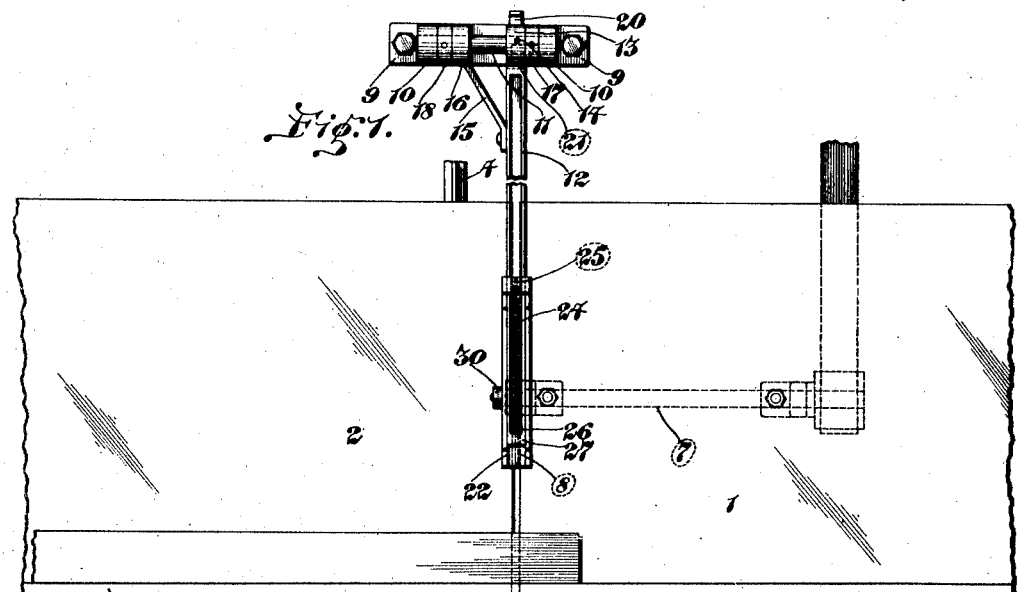
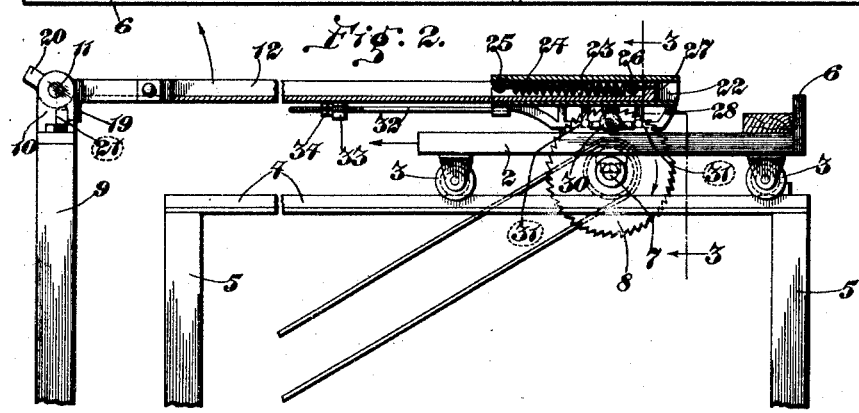
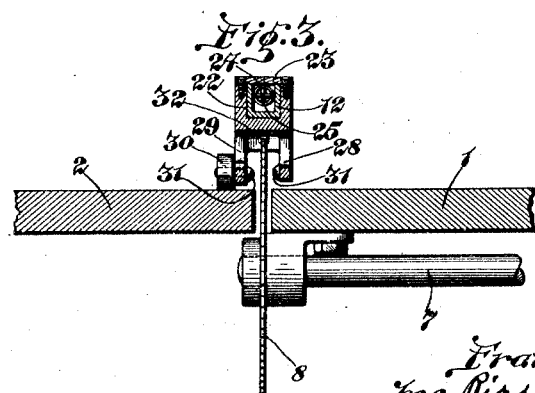
Attest:
Charles A. Becker.
Inventor.
Frank B. Heibel,
by Rippey & Kingsland
His Attorneys

UNITED STATES PATENT OFFICE.

FRANK B. HEIBEL, OF ST. LOUIS, MISSOURI, ASSIGNOR OF ONE-FOURTH TO WILLIAM O. STACY, ONE-FOURTH TO FRANK F. BENISH, AND ONE-FOURTH TO JOHN SEUFERT, OF ST. LOUIS, MISSOURI.

SAW-GUARD.

1,367,045.   Specification of Letters Patent.   Patented Feb. 1, 1921.

Application filed November 15, 1919. Serial No. 338,253.

*To all whom it may concern:*

Be it known that I, FRANK B. HEIBEL, a citizen of the United States, residing at the city of St. Louis and State of Missouri, have invented a new and useful Improvement in Saw-Guards, of which the following is a specification.

This invention relates to improvements in saw guards and consists in the novel construction hereinafter disclosed.

An object of the invention is to provide an adjustable saw guard adapted to screen the exposed edge of a circular saw, the guard being arranged for movement as the lumber is fed to the cutting edge of the saw and to automatically return to position after the lumber has been cut.

Another object of the invention is to provide a saw guard which may be readily applied to a saw including a stationary table and a carriage for feeding the lumber to the saw, the guard being arranged to travel as an incident to the natural feed to the lumber through the saw to uncover the cutting edge of the saw without exposing the saw edge, the guard being also arranged to automatically return to cover the entire cutting edge of the saw after the lumber has been cut through.

Additional features and advantages of the construction will be apparent from the following detailed description thereof taken in connection with the accompanying drawing, in which—

Figure 1 is a plan view of a saw showing the table and carriage in fragment with the saw guard of the present invention applied thereto.

Fig. 2 is a longitudinal section through the saw construction illustrating the guard in vertical section, and Fig. 3 is a transverse section taken substantially on the line 3—3 of Fig. 2.

As illustrated in the drawing, the saw guard is shown applied to a saw which includes a stationary table 1 and a carriage 2, the carriage being supported on rollers 3 that operate on a track 4 supported by a rigid frame 5. The carriage 2 is provided with a vertical front wall 6 that moves with the carriage 2 of the saw. The wall 6 constitutes a guide for the lumber feed to the saw and also a follow plate for moving the lumber to the saw when the carriage is manually moved forward by the operator.

The saw shaft 7 is mounted below the table of the machine and terminates adjacent to the interval between the edges of the table and the carriage, respectively. The saw 8 is mounted on the end of the saw shaft 7 and extends slightly above the top face of the table and carriage.

The above construction will be recognized as the usual construction of a movable carriage saw, and it is in connection with that construction that the invention is illustrated, although it will be understood that it may be applied with equal facility to a saw equipped only with a stationary table.

The construction of the invention includes a support comprising two standards 9 arranged vertically at a spaced distance from the rear of the saw. On the top of each of the standards 9 are bearings 10 in which a stud shaft 11 is journaled. A supporting arm, preferably in the form of a channel iron 12 provided with a collar 13 at its end, is mounted on the shaft 11, the collar 13 being provided with a lock screw 14 for adjustably locking the arm 12 in connection with the shaft 11. A brace in the form of an oblique arm 15 provided with a collar 16 which fits over the shaft 11 is attached to the arm 12 to prevent lateral vibration of the arm 12 and the saw guard that is supported by it. The arm 12 constitutes a pivoted bracket for the saw guard, the bracket being movable on a pivot parallel to the saw axis so that the bracket has an arcuate movement to and away from the saw. A lock collar 17 is preferably mounted on the shaft between the collar 13 and the bearing 10 on one side and a lock collar 18 is provided between the bearing and the collar 16 on the other side. The collar 13 is provided with two lugs 19 and 20 which are adapted to contact with the lug 21 supported in connection with the adjacent bearing 10. The lug 19 serves to limit the downward movement of the arm 12 and to hold the arm in proper horizontal adjustment above the saw, and the lug 20 limits the backward movement of the arm 12 when the arm and the saw guard are moved upwardly out of position over the saw table and carriage. This construction permits the bracket to be raised from the table when thick lumber is fed to the saw, and also to be raised out of position over the saw when desired.

The guard proper is preferably made of a light casting, and includes an upper channeled section 22 which is of proper dimensions to receive the forward end of the arm 12. The end of the arm 12 is seated in the channel portion 22 and is held in place by a removable cover plate 23, the plate 23 being held in place by retaining screws that enter the top edges of the side walls of the channel portion 22.

A retractile spring 24 is connected at one end to an eye 25 supported by the guard casting and the other end is connected with an eye 26 supported by an end wall 27 of the arm 12. The tendency of the spring 24 is to move the entire guard casting toward the end of the arm 12 over the saw.

Depending at each side of the portion 22 of the guard casting are open framework walls 28 and 29, the front edge of said walls being beveled downwardly so that when the forward edge of a plank of lumber is fed to the saw the saw guard will be raised upwardly, the arm 12 pivoting on the shaft 11. The space between the walls 28 and 29 form a hood to cover the exposed edge of the saw, that the projects above the top face of the plank. The wall 28 is of a slightly less width than the wall 29 so as to prevent the binding of the cut off piece of lumber with the saw guard frame.

In order to facilitate the movement of the saw guard frame and to hold it in proper horizontal adjustment so that the top edge of the saw will be out of contact with the saw guard frame, a small roller 30 may be attached to the wall 29 adjacent to the lower edge thereof. After the saw guard has been raised by the plank of lumber, the roller will ride on the top face of the plank, so that the plank may move under the guard without friction.

Both of the walls 28 and 29 are provided with small bosses 31 on their inner face adjacent to the inner edge, which serve to hold the saw guard frame away from the edge of the saw so as to prevent any accidental contact between the saw guard frame and the teeth of the saw.

In order to equip the saw guard for use with saws of different diameter and in order to center the saw guard frame properly with respect to saws of varying diameters, the forward movement of the saw guard frame with respect to the arm 12 is made adjustable.

The means for accomplishing the adjustment comprises a rod 32 attached to the rear end of the saw guard frame, the rod 32 projecting through an eye 33 secured to the under face of the arm 12 at the point about midway of the length of the arm. The end of the rod 32 is threaded to receive a pair of lock nuts 34 which may be adjusted for contact with the eye 33 limiting the relative forward movement of the saw guard with respect to the arm 12.

In operating a saw equipped with the saw guard of the present invention, the lumber is placed on the carriage of the saw and is alined against the front wall 6. The lumber is fed to the saw by the movement of the carriage 2, and as soon as the front edge of the plank of lumber contacts with the beveled front edges of the walls 28 and 29, the saw guard will raise permitting the lumber to pass thereunder, the exposed edge of the saw being fully protected. As the lumber is advanced by the movement of the carriage, the front wall 6 of the carriage contacts with the forward edge of the saw guard, and the guard moves backwardly longitudinally with respect to the arm 12, uncovering the cutting edge of the saw as the plank of lumber is cut through. The edge of the saw is never exposed, for the reason that the wall 6 abuts against the front edge of the walls of the guard, and as the wall 6 has a channel therein into which the saw enters as it makes the final cut through the lumber, the wall 6 extends over the forward edge of the saw.

It will be observed that the saw guard frame overlies the entire cutting edge of the saw when in normal adjustment and that the saw guard frame moves backwardly in conformity with the movement of the carriage so that at no time is the cutting edge uncovered. Thus, any accidental contact with it by the operator is effectually prevented. As soon as the plank of lumber is cut through and the carriage moved to the starting position, the saw guard frame automatically moves forward into place to guard the saw. It will, of course, be understood also, that the saw guard may be used with the stationary table type of saw in which the blank of lumber is moved forward across the surface of the table, the guard being raised in the same manner above described.

I am aware that the construction may be modified in certain particulars without departing from the spirit and scope of the invention. I do not limit myself, therefore, to the exact construction shown and described, but what I claim and desire to secure by Letters Patent is:

1. In a saw guard, the combination of a stationary support, a shaft mounted in said support parallel to the axis of the saw, a bracket supported on said shaft at right angles thereto and extending over the saw, a movable guard supported by said bracket adapted to shield the saw edge, said guard being movable longitudinally on said bracket, means for actuating the guard forwardly to cover the saw, said means being yieldable to the pressure against the end of the hood.

2. In a saw guard, the combination of a supporting bracket movable to and away from a position over the saw, a slidable guard mounted on said bracket, a spring connecting the guard with the forward end of said bracket, and adjustable means for limiting the forward movement of the guard with respect to the bracket.

3. In a saw guard, the combination of a pivoted bracket adapted to move in an arc to and away from the saw, means for limiting the movement of said bracket, a saw guard slidably mounted on said bracket, and a yieldable connection between the saw guard and bracket.

4. A saw guard comprising an arm formed of a channel iron extending over the saw, a saw guard having a channeled member arranged to receive the arm therein and depending side walls forming a hood extending over and shielding the exposed edge of the saw, an anti-friction roller carried by the saw guard and adapted to ride on the work support, and yieldable means for moving the saw guard toward the end of the arm to position the same over the saw.

5. In a device of the character described, a pivoted support adapted to pivot on an axis parallel to the saw axis, said support extending transversely of the axis of the saw, a saw guard slidably mounted on said arm and adapted to move longitudinally thereof, and automatic means for moving the saw guard in the opposite direction on said support when pressure thereon is released.

6. The combination with a revoluble saw and a saw table, of a vertical support arranged beyond the table, a bracket pivoted on said support and being movable toward and away from the saw in the plane thereof, a hood slidably mounted on said bracket to move longitudinally thereof in said plane, means for limiting the relative movement of said hood and said bracket, and yieldable means for moving the hood in one direction on said bracket to cover the saw.

7. In a saw guard, the combination with a pivoted bracket adapted to move in an arc toward and away from the saw, a saw guard slidably mounted on said bracket, and a yieldable connection between the saw guard and the bracket.

8. The combination with a saw table, and a revoluble saw, of a support arranged beyond the rear of the table, a pivoted arm carried by said support, a hood slidably mounted on said arm and arranged to move longitudinally thereon, and yieldable means for moving the hood in one direction on said arm.

9. The combination with a saw table and a revoluble saw, of a pivoted bracket arranged to move toward and away from the table, a saw guard slidably mounted on said bracket arranged to move in a direction parallel with the face of the table, and means for moving said saw guard in one direction in respect of the bracket.

10. The combination with a revoluble saw, and a table movable transversely with respect to the axis of the saw, of a saw guard comprising a pivoted bracket raisable from the face of the table, a saw guard supported on the bracket and being movable in direction of the movement of the table, and yieldable means connecting the saw guard with said bracket for moving the saw guard in one direction with respect thereto.

FRANK B. HEIBEL.